(12) United States Patent
Mayer et al.

(10) Patent No.: US 9,967,931 B2
(45) Date of Patent: May 8, 2018

(54) CLOCKED ELECTRONIC ENERGY CONVERTER

(71) Applicant: OSRAM GmbH, Munich (DE)

(72) Inventors: Siegfried Mayer, Moosinning (DE); Olaf Busse, Munich (DE); Christof Schwarzfischer, Wackersberg (DE)

(73) Assignee: OSRAM GMBH, Munich (DE)

( * ) Notice: Subject to any disclaimer, the term of this patent is extended or adjusted under 35 U.S.C. 154(b) by 99 days.

(21) Appl. No.: 14/913,718

(22) PCT Filed: Aug. 6, 2014

(86) PCT No.: PCT/EP2014/066878
§ 371 (c)(1),
(2) Date: Feb. 23, 2016

(87) PCT Pub. No.: WO2015/024778
PCT Pub. Date: Feb. 26, 2015

(65) Prior Publication Data
US 2016/0204700 A1 Jul. 14, 2016

(30) Foreign Application Priority Data
Aug. 23, 2013 (DE) .................. 10 2013 216 877

(51) Int. Cl.
H05B 37/02 (2006.01)
H05B 33/08 (2006.01)
(Continued)

(52) U.S. Cl.
CPC .......... H05B 33/0815 (2013.01); H02M 1/08 (2013.01); H02M 3/156 (2013.01);
(Continued)

(58) Field of Classification Search
CPC .... H05B 33/0815; H02M 1/08; H02M 3/156; H02M 2001/0032; H02M 2001/0054;
(Continued)

(56) References Cited

U.S. PATENT DOCUMENTS 6,967,449 B2 * 11/2005 Ishihara ............. H05B 41/2928
315/224
7,777,423 B2 * 8/2010 Fischer .................. H05B 41/28
315/224
(Continued)

FOREIGN PATENT DOCUMENTS

CN 102333408 A 1/2012
CN 102781139 A 11/2012
(Continued)

OTHER PUBLICATIONS

International Search Report based on application No. PCT/EP2014/066878 (4 pages and 3 pages of English Translation) dated Feb. 13, 2015 (for reference purpose only).
(Continued)

Primary Examiner — Daniel D Chang
(74) Attorney, Agent, or Firm — Viering, Jentschura & Partner mbH

(57) ABSTRACT

A clocked electronic energy converter may include an electronic switching element, at least two electrical energy storage devices, connections for connecting an electrical energy source and for connecting an electrical energy sink, a clock generator for controlling the electronic switching element and a switch-on time unit for generating a first signal for the clock generator, which switch-on time unit sets the power of the energy converter to be transmitted in a first power range by the first signal. The switch-on time unit generates a first signal representing a switch-on time for the clock generator in a second power range in which the power lower can be set than in the first power range, and the
(Continued)

clocked electronic energy converter has a switch-off time unit generating in the second power range a second signal for the clock generator, which signal represents a switch-off time depending upon the power to be transmitted.

14 Claims, 9 Drawing Sheets

(51) Int. Cl.
*H02M 1/08* (2006.01)
*H02M 3/156* (2006.01)
*H02M 1/00* (2006.01)

(52) U.S. Cl.
CPC ............... *H02M 2001/0032* (2013.01); *H02M 2001/0054* (2013.01); *H02M 2001/0058* (2013.01); *Y02B 20/346* (2013.01); *Y02B 70/1491* (2013.01); *Y02B 70/16* (2013.01)

(58) Field of Classification Search
CPC ......... H02M 2001/0058; Y02B 20/346; Y02B 70/1491; Y02B 70/16
See application file for complete search history.

(56) References Cited

U.S. PATENT DOCUMENTS

| | | | | |
|---|---|---|---|---|
| 8,125,158 | B2* | 2/2012 | Nishino | H02M 1/4208 315/247 |
| 8,716,949 | B2* | 5/2014 | Watanabe | H05B 33/0815 315/224 |
| 2004/0189217 | A1 | 9/2004 | Ishihara et al. | |
| 2012/0007515 | A1 | 1/2012 | Krummel | |
| 2012/0286686 | A1 | 11/2012 | Watanabe et al. | |
| 2013/0063031 | A1 | 3/2013 | Pollischansky | |
| 2013/0119861 | A1 | 5/2013 | Vollmer | |
| 2013/0140999 | A1 | 6/2013 | Aboulnaga | |
| 2013/0141017 | A1 | 6/2013 | Esaki et al. | |
| 2016/0204693 | A1* | 7/2016 | Mayer | H02M 1/4225 323/205 |

FOREIGN PATENT DOCUMENTS

| | | |
|---|---|---|
| CN | 103026786 A | 4/2013 |
| EP | 2523532 A2 | 11/2012 |

OTHER PUBLICATIONS

German Search Report based on application No. 10 2013 216 877.2 (5 pages) dated Mar. 6, 2014 (for reference purpose only).

Jeffrey Hushley: "PowerPSoC Firmware Design Guidelines ; DigiKey", Digi-Key, May 27, 2011, pp. 1-17, XP055167451, URL:http://www.digikey.com/en/articles/techzone/2011/may/powerpsoc-firmware-design-guidelines, retrieved on Feb. 5, 2015.

Anonymous: "Flexible Power for Versatile Micros ; DigiKey", Jan. 8, 2013, XP055167552, URL:http://www.digikey.com/en/articles/techzone/2013/jan/flexible-power-for-versatile-micros, retrieved on Feb. 5, 2015.

Chinese Office Action based on application No. 201480046594.8 (7 pages) dated Dec. 21, 2016 (Reference Purpose Only).

* cited by examiner

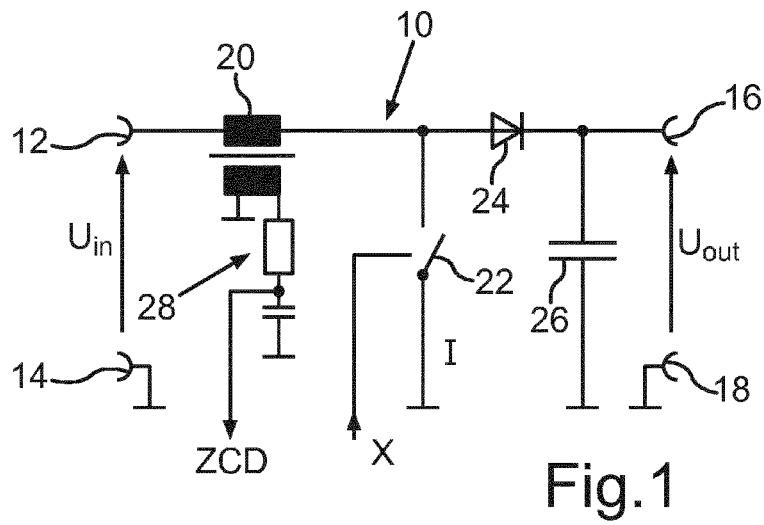
Fig.1
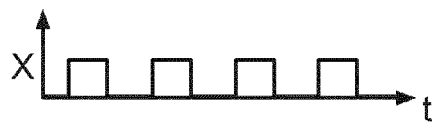
Fig.2
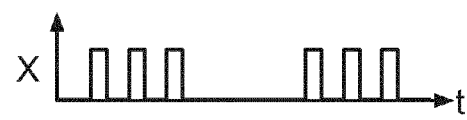
Fig.3
Fig.4
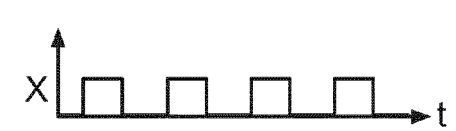
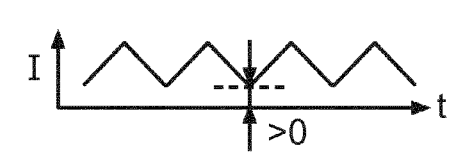
Fig.5

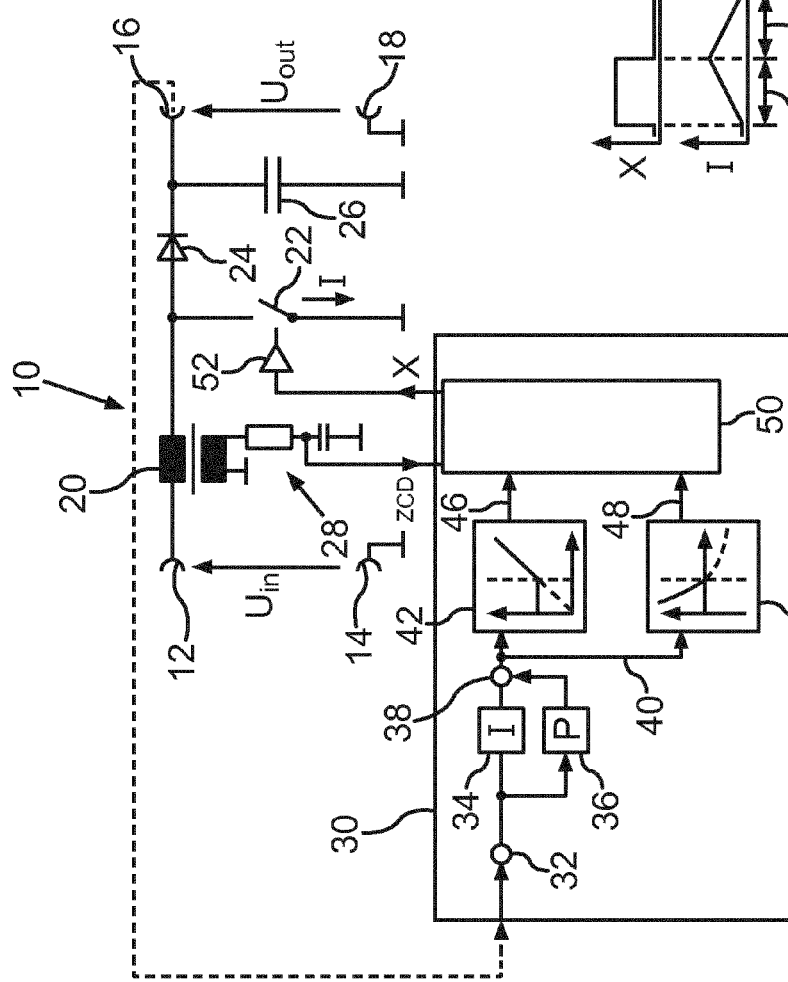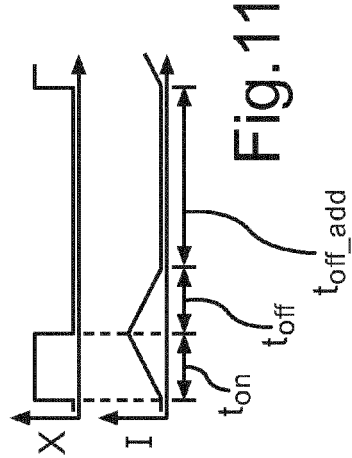

CLOCKED ELECTRONIC ENERGY CONVERTER

RELATED APPLICATIONS

The present application is a national stage entry according to 35 U.S.C. § 371 of PCT application No.: PCT/EP2014/066878 filed on Aug. 6, 2014, which claims priority from German application No.: 10 2013 216 877.2 filed on Aug. 23, 2013, and is incorporated herein by reference in its entirety.

TECHNICAL FIELD

Various embodiments generally relate to a clocked electronic energy converter including an electronic switching element, at least two electrical energy stores, a connection for connecting an electrical energy source, a connection for connecting an electrical energy sink, a clock generator for driving and operating the electronic switching element in switching operation, and a switch-on time unit for generating a first signal for the clock generator, which switch-on time unit is designed to set a power to be transmitted of the energy converter in a first power range by means of the first signal. Furthermore, various embodiments relate to a lighting device including an illuminant and an electronic connection for connecting the lighting device to an electrical energy source. Finally, various embodiments relates to a method for setting an electrical power to be transmitted by means of a clocked electronic energy converter, for which purpose an electronic switching element of the electronic energy converter is operated in switching operation, wherein, in a first power range, the power is set depending on a settable switch-on time and a switch-off time for the electronic switching element, said switch-off time arising intrinsically as a result of the electronic energy converter and following the switch-on time.

BACKGROUND

Dimmable ballasts having a large input and output voltage range are increasingly being demanded in light emitting diode applications. Therefore, a settable power range which significantly exceeds a settable power range of a customary ballast for fluorescent lamps is demanded in light emitting diode applications. Although in the case of fluorescent lamps, too, there are ballasts which can dim different loads in each case down to a partial power of approximately 1%, said ballasts must additionally always apply a basic power for the heating of the electrode filaments of the fluorescent lamps, such that converter stages of the ballasts always have to apply a corresponding minimum power that is rarely less than 10% of the rated power. This is different in the case of ballasts for solid-state lighting (SSL). Here a power range that can be set to 100 mW or to a few percent of the rated power is often demanded. In this context, US 2012/0286686 A1 discloses a lighting device for a solid-state light source.

SSL ballasts often include energy converters, or converters, which are operated in switching operation, that is to say are clocked. In order to be able to generate the very low powers, the converters are often operated at very high frequencies. This not only causes high switching losses, but furthermore can also cause problems with regard to electromagnetic compatibility (EMC).

Furthermore, operation at high frequencies requires power components suitable therefor and, if appropriate, corresponding circuitry measures, which are associated with high costs. For this reason, such converters for providing very low powers, for example in the boost operating mode or else in the buck operating mode, below a predefined comparison power, are operated in a so-called burst operating mode. The burst operating mode is distinguished by the fact that the converters remain switched on for a few clock cycles and are then deactivated for a longer time, that is to say a plurality of clock cycles. The burst operating mode proves to be disadvantageous insofar as evolution of noise as a result of frequencies in the audible range that arise from the sequence of the burst packets can be the consequence and an intermediate circuit of such a converter can have increased ripple on account of operation following the principle of a two-point controller.

SUMMARY

The present disclosure proceeds from a converter in the form of a clocked electronic energy converter, which can be embodied for example as a single-stage converter circuit. Such an energy converter can be for example a step-up converter or else a step-down converter.

Various embodiments relate to an energy converter and a method for operating it, and also a lighting device, in such a way that setting of very low powers to be transmitted is improved.

Various embodiments make use of being able to achieve a seamless transition in the power setting from a transition mode to the discontinuous mode. The advantages that can be afforded thereby are that, as the power is reduced, firstly the frequency becomes higher and higher and then becomes lower again as the power is reduced further on account of the change to the discontinuous mode. Seamless in this context means that a transfer function does not change and primarily has no steps, bends or other discontinuity points.

The transfer function depends directly on the switch-on time and the switch-off time of the electronic switching element of the energy converter. In the transition mode, the switch-on time is usually set externally, and the correct switch-off time is ensured by a hardware circuit or arises intrinsically on account of a circuit topology and/or the function thereof. If a power factor condition, also called power factor control (PFC), is additionally intended to be met, a constant switch-on time generally suffices.

If the switch-on time and the switch-off time are constant in the steady state, a transition from the transition mode to the discontinuous mode should fundamentally be possible without any problems. In accordance with one aspect of the present disclosure, firstly the present switch-off time is determined. A detection circuit for the current zero crossing is deactivated in order to change the mode. A fixed switch-off time of the same length as measured previously is then programmed. The change of mode per se subsequently takes place by the lengthening of the programmed switch-off time.

In the event of small disturbances, the system can immediately change to the continuous mode, whereupon high currents can flow. This can be alleviated by a current sensor and a comparator that switches off excessively high currents. However, two disadvantages then still persist, namely that, firstly, the electronic switching element and the diode undergo hard switching and, secondly, a current-time integral becomes significantly greater, for example a risk of flicker occurs.

Alternatively, for a change of mode, provision can be made of a certain temporal separation with respect to the measured switch-off time, as a result of which, however, a jump can be brought about. Although said jump could be compensated for by switch-on times being changed again, the abrupt transition still persists. Alternatively or additionally, a hysteresis can be introduced in order to avoid chatter around such an abrupt transition.

Various embodiments therefore propose, in particular, that, in respect of the energy converter, the switch-on time unit is designed to generate, in a second power range, in which the power can be set to be less than in the first power range, a first signal for the clock generator, said first signal representing a fixedly predefined switch-on time, and the clocked electronic energy converter includes a switch-off time unit, which generates a second signal for the clock generator in the second power range, said second signal representing a supplementary switch-off time depending on the power to be transmitted. In this case, the electronic energy converter is designed to control the switch-on time unit and the switch-off time unit jointly by means of a single third signal.

Various embodiments thus provide a hybrid mode having the following features:

the switch-on time is calculated as previously, but is kept constant starting from a specific lower limit. The lower limit is given by the transition from the first power range to the second power range. In the second power range, in which the power is less than in the first power range, the switch-on time is not changed further.

The switch-off time produced in terms of hardware by the current zero crossing at the inductance is maintained.

The additional supplementary switch-off time is introduced following the switch-off time or else before the switch-on time.

Simplifications for AC voltage operation.

The reduction of the transmitted power, starting from the lower limit of the switch-on time, is no longer carried out by the switch-on time being decreased further, but rather by the switch-off time being increased. The present disclosure thus avoids operation that can lead to noises or visible effects when a lighting device is operated.

An electrical energy store within the meaning of the present disclosure is, for example, an electronic inductance, a capacitor, combinations, in particular networks, thereof and/or the like. Besides a battery, in particular a rechargeable battery, the electrical energy source can be a fuel cell, a generator set operated by an internal combustion engine, a wind turbine, a solar cell, but also, in particular, a public energy supply network, combinations thereof and/or the like.

The energy sink is generally formed by an electrical load, which can preferably be an illuminant or the like. Of course, the present disclosure is not restricted to illuminants, but rather can of course also be used for other electrical loads, for example heating systems, air conditioning systems, fans, combinations thereof and/or the like.

A single-stage energy converter of the generic type usually includes at least one electronic switching element, in particular a transistor, a thyristor, or the like. This switching element is often combined with a diode in order to be able to achieve the desired conversion effect. Of course, a second electronic switching element can be used instead of the diode. The transistor can be, for example, a bipolar transistor, but also a field effect transistor, in particular a MOSFET, an IGBT or the like. In principle, however, a thyristor arrangement, in particular a GTO or the like, can also be used as an electronic switching element.

In respect of the lighting device, it is proposed, in particular, that the lighting device includes a clocked electronic energy converter according to the present disclosure, which supplies, as load, the illuminant with electrical energy in a power-controllable manner. Accordingly, the lighting device according to the present disclosure has the same effects and advantages as the energy converter according to the present disclosure.

In respect of the method, it is proposed, in particular, that in a second power range, in which the power is set to be less than in the first power range, the switch-on time is kept substantially constant and the switch-off time is lengthened by a supplementary switch-off time for the electronic switching element, which supplementary switch-off time can be set depending on the power to be transmitted. Accordingly, the advantages and effects already mentioned with respect to the energy converter are achieved with the method.

Overall, it should be emphasized that the driving, starting from a specific switch-on time, can change transitionlessly from the transition mode to the discontinuous mode. In this case, starting from a lower minimum switch-on time, the switch-on time is not reduced further in the second power range, but instead an additional switch-off time is added after the normal switch-off time defined by the freewheeling phase. In this case, the minimum switch-on time should not fall below specific limits. Furthermore, the supplementary switch-off time should be calculated as a function of the power in such a way that no discontinuities form in the transfer function of the overall system. In this regard, the control can operate stably and flicker, for example, can be avoided.

As a result, the present disclosure avoids the quasi two-point controller and the attendant low frequencies which can entail noise problems. In addition, the ripple of the output variable is lower.

The joint control of the switch-on time unit and the switch-off time unit by means of a single third signal affords the advantage that the present disclosure can be integrated into existing control concepts particularly easily. Ideally, adaptation for example of controller parameters or the like can be dispensed with in such a case.

In accordance with a further aspect of the present disclosure, it is proposed that the switch-on time unit and the switch-off time unit are embodied in such a way that the transmitted power is changed continuously in the event of a change of the power range. This has the advantage that power jumps can largely be avoided during the control or regulation of the clocked electronic energy converter. Although two ranges adjoining one another with regard to the settable power are provided, the power can be set substantially continuously over the entire range formed by both power ranges. This has further advantageous effects for a control unit of the clocked electronic energy converter, which control unit may include the clock generator, for example. The clock generator serving for driving and operating the electronic switching element in switching operation itself receives control signals, in particular the first signal of the switch-on time unit, on the basis of which it provides a control signal for the electronic switching element. If the energy converter includes a plurality of electronic switching elements, the clock generator can for example correspondingly generate a dedicated control signal for each switching element. This is expedient for example in the case of clocked electronic synchronous converters which can be operated both in the boost operating mode and in the buck operating mode and have two electronic switching elements for this purpose.

A further advantage of this feature can be seen in the fact that the control signal of the clock generator and thus also the frequency of the clocked electronic energy converter are limited. The maximum value for the frequency is attained in the transition from the first to the second power range. In the second power range, the frequency does not increase further, but rather is even reduced again on account of the supplementary switch-off time in conjunction with the fixed minimum switch-on time with decreasing power. This furthermore makes it possible to implement digital control substantially without any problems. Difficulties in digital control or regulation of the energy converter can thus largely be avoided by means of the present disclosure.

In one advantageous development, the switch-off time unit is designed to carry out the determination of the supplementary switch-off time in the second power range taking account of an electrical voltage present at the first connection and/or an electrical voltage present at the second connection.

This affords the possibility of determining, depending on the voltage present at the first connection and/or at the second connection, the supplementary switch-off time in the second power range such that a desired transfer response results. In particular, in a control loop it may be necessary to realize a specific transfer function, for example a linear behavior. In this case, the voltage can be determined by a corresponding measuring device. A value can likewise be set by a parameter if it is established that a device is operated for example only from a 12 V on-board motor vehicle electrical system. Furthermore, a voltage value for a voltage present at the first connection and/or at the second connection can be derived from a setpoint value of an external controller if the external controller is intended to set the voltage present at the corresponding connection to the voltage value correlated with the setpoint value.

Preferably, the switch-off time unit can be designed to determine a voltage form of the electrical voltage present at the first connection and to carry out the determination of the supplementary switch-off time in the second power range depending on the determined voltage form. Voltage forms under this aspect are, besides DC voltage, AC voltages, in particular zero-mean AC voltages, for example having a sinusoidal, rectangular, triangular or trapezoidal profile. They likewise include unipolar voltages which arise as a result of the rectification of such an AC voltage, for example, and mixed forms.

The energy converter can therefore be designed to be operated both from a DC voltage and from an AC voltage, for example 230 V~/50 Hz, wherein the switch-off time can be designed to differentiate between DC voltage operation (DC) and AC voltage operation (AC) and, depending on the AC/DC differentiation, to employ a respectively suitable method for determining the supplementary switch-off time, for example in the form of a respectively optimized calculation specification. This affords the advantage that even in the case of feeding with different voltage forms, the energy converter can have a comparable transfer response, without an intervention in the energy converter being necessary. In this case, the transfer response is given by the correlation between the third signal, which controls both the switch-on time unit and the switch-off time unit, and the power transmitted by the energy converter.

In accordance with a supplementary aspect of the present disclosure, it is proposed that the energy converter is designed to operate in the second power range in the case where a power of the energy converter that is drawn at the first connection is at most 1 W, preferably at most 500 mW, in particular at most 200 mW. In this case, as already explained in the summary of the present disclosure, this can result in operation with a fixed switch-on time, which assumes the value of a predefinable minimum switch-on time in the second power range, and a comparatively long supplementary switch-off time. Given suitable dimensioning of the energy converter, it is then possible to operate the electronic switching element at a frequency which is above the audible range. This makes it possible, in particular, to prevent for example inductive components or capacitors, with multilayer ceramic capacitors (MLCCs) being particularly critical, from being excited to noise emission. Such a power range can be present in a standby operating mode, for example, in which the electrical energy sink is in an inactive state and a very low power is to be provided for a standby device. This can be an illuminant, for example, which is switched off and can be activated by means of a suitable input unit, for example an infrared remote control or a radio remote control. It would be particularly disturbing here if a switched-off illuminant made an unpleasant impression owing to whistling or the like.

A further configuration of the present disclosure provides for the energy converter to include a detection unit for determining a switch-off time for the electronic switching element, said switch-off time arising intrinsically as a result of the electronic energy converter. The switch-off time that arises intrinsically is the time required by one of the energy stores used for the energy conversion to transfer its energy into the second energy store after the electronic switching element has been switched off. In the case of an inductance as the first energy store, such as, for example, in the case of a single-stage step-up converter or a single-stage step-down converter, the intrinsic switch-off time is given by the fact that a time period is determined which begins with the switching off of the electronic switching element and ends with the inductance current of zero being reached. At this point in time, the inductance has completely passed on the energy stored in it on account of the current flow. For this purpose, the detection unit can be, for example, a current sensor, a voltage sensor, a magnetic field sensor, a combination thereof and/or the like. In the case of a capacitor as energy store, a voltage sensor is preferably provided. In the case of an inductance, this can be realized by a current sensor. Furthermore, in the case of an inductance, there is the possibility of fitting an auxiliary winding to the inductance and detecting the energy state of the inductance by means of said auxiliary winding.

The energy converter may furthermore include an energy detector for detecting at least the energy stored in one of the electrical energy stores of the energy converter. In the case of a capacitor as energy store, the energy detector can be a voltage sensor that detects the voltage present at the capacitor. In the case of an inductance, the energy detector can be, for example, a magnetic field detector that detects the magnetic field, for example a detection coil, a Hall sensor or the like. In the case of an inductance, a current sensor can supplementarily also be provided as energy detector.

Accordingly, the present energy content of the energy store can be determined thereby.

In accordance with a further aspect of the present disclosure, it is proposed that the power to be transmitted is changed continuously in the event of a change in the power range. What is achieved as a result is that power jumps in the transition from the first power range to the second power range, and vice versa, can largely be avoided. This allows reliable operation of a load connected to the energy converter. This can be realized by different control or regulating units being provided for the power ranges, the signals of which units are embodied such that they lead to a substantially identical control signal for the electronic switching element in the adjoining region of the two power ranges.

In accordance with a further aspect of the present disclosure, it is proposed that the supplementary switch-off time is determined in the second power range in such a way that the power to be transmitted depends on the third signal in the same way as if the power to be transmitted in the second power range were controlled analogously to the first power range. This last is tantamount to nothing more than extending the first power range to the second power range in such a way that the first signal generated from the third signal by the switch-on time unit is not limited by the minimum switch-on time and the second signal generated from the third signal by the switch-off time unit represents a supplementary switch-off time of zero.

The comparative consideration corresponds to a parameterization of the switch-on time unit and the switch-off time unit with a minimum switch-on time of zero, which is tantamount to the second power range vanishing, said second power range being completely absorbed in the first power range.

For the special case where the switch-on time unit forwards the third signal directly as first signal and, if appropriate, limits the first signal to the minimum switch-on time, such that the first signal can never become smaller than the minimum switch-on time, the third signal in the second power range can be considered as a fictitious switch-on time. Consequently, the determination of the supplementary switch-off time should be carried out in such a way as to result in the same power transmission of the energy converter as if the fictitious switch-on time were provided directly to the clock generator and no supplementary switch-off time were introduced. With the use of this method for determining the supplementary switch-off time, a continuous and smooth curve necessarily arises in the transition from the first power range to the second power range, said curve characterizing the relationship between the third signal and the transmitted power of the energy converter, that is to say that the curve has no bend when the switch-on time limitation is reached.

In accordance with one supplementary aspect of the present disclosure, it is proposed that the time period required by one of the electrical energy stores of the energy converter after the switch-on time until it no longer outputs electrical energy is determined as the switch-off time. Said switch-off time corresponds to the intrinsic switch-off time because it necessarily arises on account of a circuit topology of the energy converter and a predefined operating method.

Switching times such as switch-off time or switch-on time within the meaning of this disclosure are time periods which each have a start point in time and an end point in time. In this regard, the switch-on time is a time period in which the electronic switching element is switched on by means of the control signal of the clock generator. By contrast, the switch-off time is a time period in which the electronic switching element is switched off by means of the control signal of the clock generator, that is to say that substantially no current flow is possible through the electronic switching element. During the switch-on time, the electronic switching element is electrically conductive, wherein only a very small voltage is dropped across the electronic switching element in the event of a current flow, said voltage corresponding for example to a saturation voltage of a bipolar transistor or the like.

In accordance with a further aspect of the present disclosure, it is proposed that the supplementary switch-off time, which also constitutes a time period, is determined depending on the fictitious switch-on time calculated for the second power range. In this configuration, the calculation of the supplementary switch-off time is based on the fact that a first signal as in the first power range is present, but said first signal does not serve for feeding the clock generator for generating a corresponding control signal for the electronic switching element in the second power range, but instead for calculating the supplementary switch-off time. This signal is a fictitious switch-on time insofar as it would represent a switch-on time if the same control mode as used in the first power range continued to be used in the second power range. This has the advantage that the present disclosure can be implemented or retrofitted for already existing conceptions for generic energy converters in a simple way. It is therefore not necessary to develop a completely new control for an energy converter according to the present disclosure. In particular, this configuration is particularly suitable for implementation in digital control or regulation for the energy converter.

Preferably, the supplementary switch-off time is determined depending on the third signal, wherein the determination is carried out by means of a reciprocal value—weighted with a factor—of the third signal, from which an offset value in the form of a constant is subtracted. As a result, it is possible to achieve a shift of a function graph to the effect that the function graph includes the pair of values "minimum switch-on time" and "zero". This determination specification is particularly well suited to implementation in a digital assembly, in particular a microprocessor or microcontroller.

A further configuration of the present disclosure provides for the supplementary switch-off time to be determined such that the power to be transmitted is set without a discontinuity in the transition from one power range to the other. This feature makes it possible that power jumps when changing from one power range to the other power range can substantially be avoided. This makes it possible for loads connected to the energy converter to be operated without power jumps in the setting of the power, such that the intended operation of the connected load and also of the energy converter can be improved. In particular, this feature avoids a situation in which—unlike in the related art—the change of the power range can be realized without power jumps, even though the operating modes differ between the two power ranges. This furthermore makes it possible that—likewise in contrast to the related art—a hysteresis in the transition from one power range to the other can substantially be avoided. Nevertheless, the present disclosure ensures reliable operation, in particular when setting the power to be transmitted with a change of power range.

A further aspect of the present disclosure provides for the supplementary switch-off time to be determined taking into account in each case steady-state conditions for an electrical voltage of an energy source connected to the energy converter and of an electrical voltage provided by the energy converter for a load connected to the energy converter such that the supplementary switch-off time depends exclusively on the desired power. This measure makes it possible that the determination of the supplementary switch-off time can be considerably simplified. As a result, a very fast determination of the supplementary switch-off time can be realized, and it is furthermore possible to achieve particularly simple control or regulation of the energy converter during operation in the second power range. By way of example, it can be provided that steady-state conditions are equivalent to a constant value for the electrical voltage of the energy source connected to the energy converter, wherein the constant value for the electrical voltage is a mean value, a root-mean-square value or the like. Furthermore, the value can be adapted by means of a factor in order to achieve reliable operation and a reliable calculation of the supplementary switch-off time. In principle, the same applies to the electrical voltage provided by the energy converter.

Furthermore, it is proposed that the energy converter, on the input side, uses an AC voltage and is controlled in such a way that an input-side power factor is maximized. This makes it possible to reduce perturbations affecting the energy source, which in this case is an AC voltage source. In particular, this feature can be embodied as power factor control (PFC) or power factor regulation.

In one preferred development, the supplementary switch-off time, in the case of a constant third signal, is likewise constant within half a period or a whole period of the AC voltage used on the input side. This results in the same simple control structure as in the case of a DC voltage, just the method for determining the second signal representing the supplementary switch-off time as a function of the third signal differs from the case of a DC voltage present in each case at the first connection and at the second connection. Preferably, here instead of a complex calculation during operation, the second signal can be determined from the third signal with the aid of a table of values. In particular, the table can be set up nonlinearly, wherein function ranges with little change are registered by support points with larger separations and function ranges with great changes are registered by support points with narrower separations. Intermediate values can then be obtained in a simple manner with good accuracy by interpolation.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 1 shows a schematic basic circuit diagram for a clocked electronic energy converter according to the present disclosure as a step-up converter, FIG. 2 shows two diagrams which schematically show signal profiles in a transition mode, FIG. 3 shows two diagrams which schematically show signal profiles in a burst mode, FIG. 4 shows two diagrams which schematically show signal profiles in a discontinuous mode, FIG. 5 shows two diagrams which schematically show signal profiles in a continuous mode, FIG. 11 shows two diagrams which schematically illustrate signal profiles of the circuit according to FIG. 10 in the second power range.

DETAILED DESCRIPTION

Figure 6:
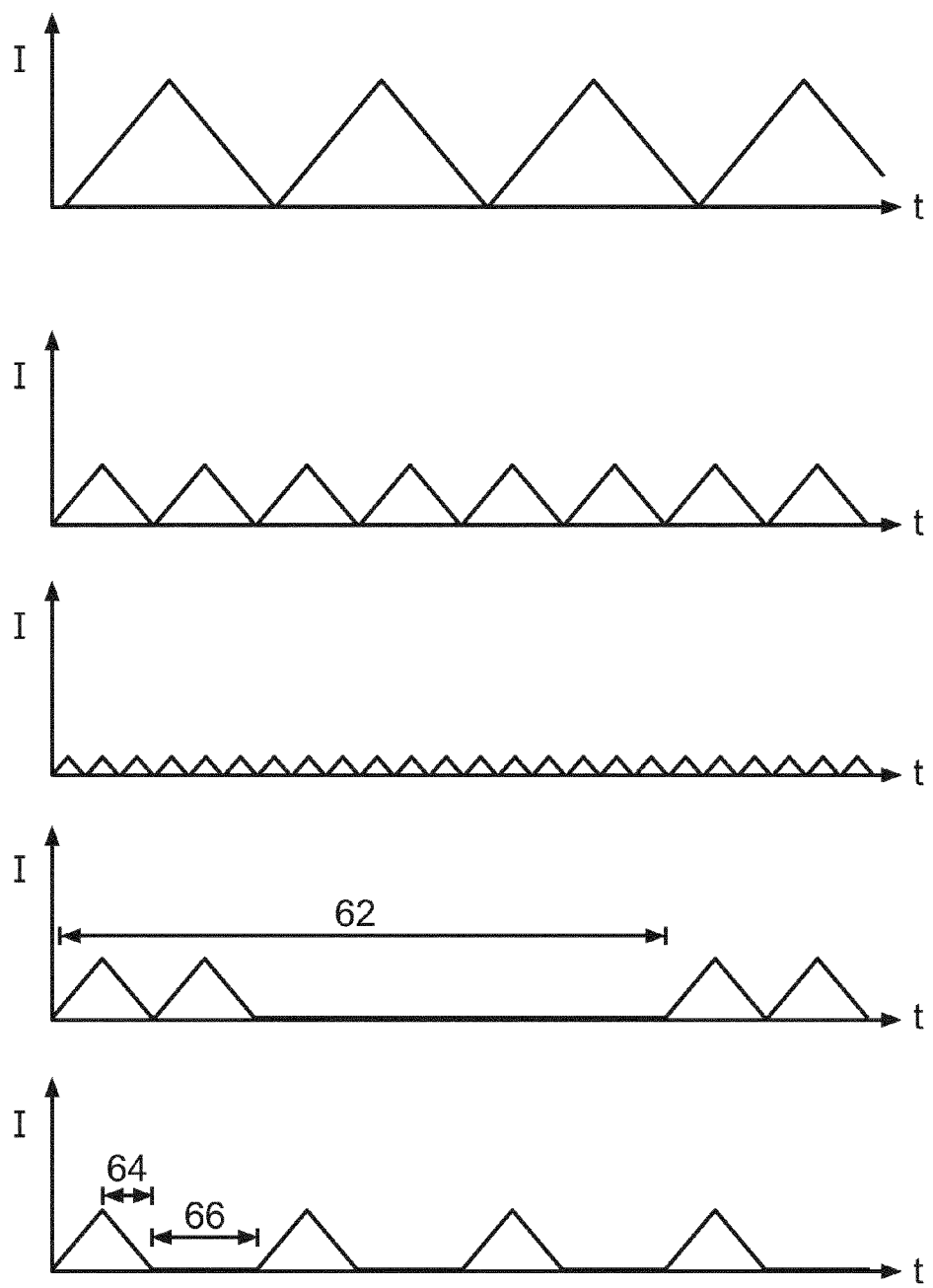
FIG. 6 shows further diagrams of schematic current profiles through an inductance as an electrical energy store for different operating modes and operating powers, FIG. 7 schematically shows two pairs of diagrams showing the different operating modes in the burst mode.

A generic energy converter can be operated in different operating modes, in principle, thus for example in a continuous mode, a transition mode, a discontinuous mode and a burst mode. The transition mode is in widespread use in a medium power range which can be set by means of the energy converter, and also at relatively high voltages, for example in power supply system operation. If the energy converter is provided for being operated from an AC voltage source as energy source, a control of the energy converter is often provided in such a way that power factor control is provided. The transition mode is even predominant in the case of such control operation. By contrast, often the discontinuous mode and moreover also the burst mode are used in the case of simple power supply units as energy converter and also in the case of low powers.

An energy converter of the generic type is schematically illustrated with regard to the basic circuit as a circuit diagram in FIG. 1. FIG. 1 shows a clocked electronic energy converter 10 as a step-up converter having an input connection including connection terminals 12, 14, between which an input voltage of an energy source (not illustrated) is present. Furthermore, the energy converter 10 includes an output connection having connection terminals 16, 18, between which an output voltage for an electrical energy sink (not illustrated) is present. The connection terminal 14 and the connection terminal 18 are electrically conductively connected to one another and form an electrical reference potential in the present case. The input voltage and the output voltage are thus not galvanically isolated. In alternative circuit topologies, a galvanic isolation between the connection terminals 12 and 14 and also the connection terminals 16 and 18 can be provided. This is not important, however, for the principle of the present disclosure.

The connection terminal 12 is connected to a first connection of an inductance 20, which is connected by its second connection to an electronic switching element, here a MOSFET 22, and also to an anode of a diode 24. The MOSFET 22 is connected by its drain connection to the inductance 20. Its source connection is electrically conductively connected to the connection terminals 14 and 18.

A cathode of the diode 24 is connected to a first connection of an intermediate circuit capacitor 26, which for its part is connected to the connection terminal 16. The intermediate circuit capacitor 26 is connected by its second connection to the connection terminals 14 and 18. The output voltage at the connection terminals 16, 18 thus corresponds to the intermediate circuit voltage at the intermediate circuit capacitor 26.

Furthermore, a detection unit 28 is magnetically coupled to the inductance 20, by means of which detection unit it is possible to determine when the inductance 20 receives no more energy. The detection unit 28 has a connection (not designated) for a signal ZCD (zero crossing detection), which is fed to a control unit 30 (FIG. 10), not illustrated in this figure. The control unit 30 furthermore supplies a signal X, which is fed to a gate connection of the MOSFET 22, by means of which the MOSFET 22 can be operated in switching operation.

FIG. 2 schematically shows, in two associated diagrams, signal profiles of the control signal X (upper diagram) for the MOSFET 22 and the current profile through the inductance 20 (lower diagram) against time. As is evident from a lower diagram in FIG. 2, the current through the inductance 20 rises with the switching on of the MOSFET 22 beginning with a current at zero up to a maximum value, at which the MOSFET 22 is switched off by means of the signal X. In the subsequent switching pause, the current commutates from the MOSFET 22 to the diode 24 and is fed into the capacitor 26 via the diode 24. The current through the inductance 20 decreases to zero during this phase. At this point in time, the inductance 20 has completely passed on its stored energy.

This state is detected by means of the detection device 28 and the control unit 30 outputs a new switching pulse as signal X, by means of which the MOSFET 22 is switched on again and the scenario described above is repeated. The power transmitted by the energy converter 10 can be set by way of the duty ratio of this control sequence, that is to say the length ratio between pulse and switching pause of the signal X.

FIG. 3 schematically shows the signal profile in the burst mode in two diagrams illustrating the same signals as in FIG. 2. As is evident from FIG. 3, here in this specific example in each case three short switch-on pulses are implemented as burst pulses one after another, which are followed by a relatively long pause. The current profile at the inductance 20 is established correspondingly, as illustrated in the lower diagram of FIG. 3.

FIG. 4 schematically shows a signal profile in the discontinuous mode in two diagrams as in FIGS. 2 and 3. Individual switch-on pulses separated by relatively long pause times can be discerned. The corresponding current profile through the inductance 20 is again illustrated in the lower diagram.

FIG. 5 likewise shows two diagrams as in the preceding FIGS. 2 to 4, but the diagrams now schematically illustrate the signal profile in a continuous mode. In contrast to the transition mode, in the continuous mode the MOSFET 22 is controlled in such a way that the current through the inductance 20 is always greater than zero, that is to say even when the MOSFET 22 is switched on, which leads to said disadvantageous hard switching.

Modern power supply units nowadays have to cover a wide power range. Reasons for this may be:
wide input voltage range,
wide output power range, for example in power supply units of light emitting diodes owing to the requirement for dimming,
on account of requirements made of behavior in standby operation, in which the device is still supplied with electrical energy but requires only a very low power.
Problems occur particularly at very low powers. During operation in the transition mode, the frequency is very high, which can have the effect that the bandwidth of the driving no longer suffices to be able to reach even higher frequencies. In the case of digital driving, furthermore, the resolution can become poorer and the control behavior of the control loop can vary, such that, for example, a continuous controller becomes a two-point controller, for example if the required switch-on time reaches the vicinity of individual ticks.

In order to avoid this problem, the transition mode is often left and the device is operated in the discontinuous mode or in the burst mode.

FIG. 6 shows in several diagrams the effects of the different modes at different powers on the current through the inductance 20. The topmost diagram in FIG. 6 shows the coil current in the transition mode for a high power. The frequency is correspondingly low and the current amplitude is correspondingly high.

The second diagram from the top illustrates the same operating mode for a low power. It can be discerned that the current through the inductance 20 has become significantly smaller in terms of its amplitude and, at the same time, the frequency has become significantly higher.

The third diagram from the top in FIG. 6 illustrates the transition mode for the lowest power. The frequency is once again considerably higher than for the two operating powers mentioned above, whereas the amplitude is correspondingly very much smaller. Such operation is not expedient in practice.

The fourth diagram from the top illustrates the burst mode, wherein it is evident at the same time that, on account of the correspondingly long pause times, there is the risk of audible noises being generated. The period 62 having a duration $t_x=1/f$ arises here.

The bottommost diagram illustrates the discontinuous mode. A normal freewheeling phase 64 is followed here by an additional off time 66.

In the transition to the burst mode, either individual cycles have to be omitted or it is necessary to change to a second modulation mode, the PWM burst mode. In the PWM burst mode, the output power is not kept constant by a two-point controller, rather a PWM having a variable duty ratio is superposed on the driving signal for the electronic switching element 22.

Figure 7:
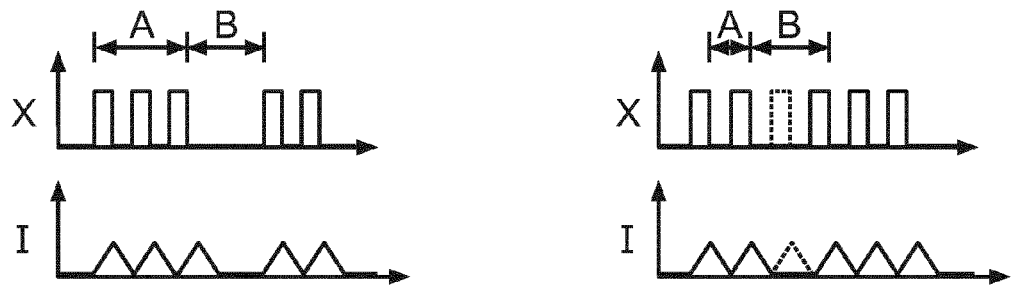

FIG. 7 schematically shows burst modes. A PWM burst mode is illustrated on the left-hand side. In this case, the time period A+B is constant, wherein with 1/(A+B) an additional and significantly lower frequency occurs, which can cause problems with regard to EMC, harmonics, noises, light flicker and the like. In any case, an additional, significantly lower frequency is applied to the system. Such a change in the operating mode can cause problems, particularly if a superordinate controller then has to calculate a PWM duty ratio instead of a previous switch-on time for the electronic switching element. Although this can be realized in digital technology, the low frequency that suddenly occurs can lead to various problems:
difficult transitions,
in the case of power factor control, problems with regard to EMC or harmonics can arise,
noise problems often occur as well, since the frequencies that arise are usually in the audible range,
in lighting solutions, beats having power supply system frequency, for example, can also arise, which ultimately affect the luminous effect of an illuminant, for example by virtue of the brightness fluctuating slightly, that is to say the light becoming unsteady, synchronization with the power supply system frequency may become necessary, in addition, a problem with an excessively low resolution can occur; omitting whole pulses can result in power jumps; in PWM operation, half cycles can also be generated, for example by virtue of the last pulse being shorter; the disadvantage here is that the relationship between the PWM duty ratio and the power is no longer continuous, but rather stepped.

Figure 8:
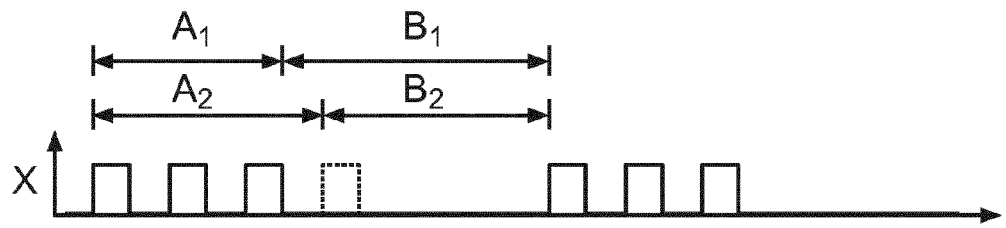
FIG. 8 shows a diagram which schematically illustrates a PWM operating mode with varying duty ratio for the same power.

FIG. 8 shows three different drivings of the electronic switching element, which lead to the same transmitted power despite different duty ratios.

The hybrid mode already mentioned initially can be realized in a controller for a generic energy converter as follows, in particular also subsequently. The minimum switch-on time is to be determined. The controller is to be extended by an output for the supplementary switch-off time. Furthermore, a characteristic curve for the supplementary switch-off time is to be determined.

Directly after the switch-on time has elapsed, the system including inductance and parasitic capacitances, in particular that of the electronic switching element, can oscillate. This can lead to a problem precisely if, after the switching on of the electronic switching element, a zero crossing detection signal (ZCD) is not pulled below a detection threshold again, for example in the case of very short switch-on times. This can then lead to premature triggering. Corresponding signals are illustrated with reference to FIG. 9, for example. In the worst case, that is to say in the case of extremely short switch-on times, after the switch-on time has elapsed, that is to say after the switching off of the MOSFET 22, the diode 24 is no longer turned on at all, and parasitic oscillation described above is superposed on the zero crossing detection signal in such a way that this oscillation per se is incorrectly interpreted as a trigger signal.

Figure 9:
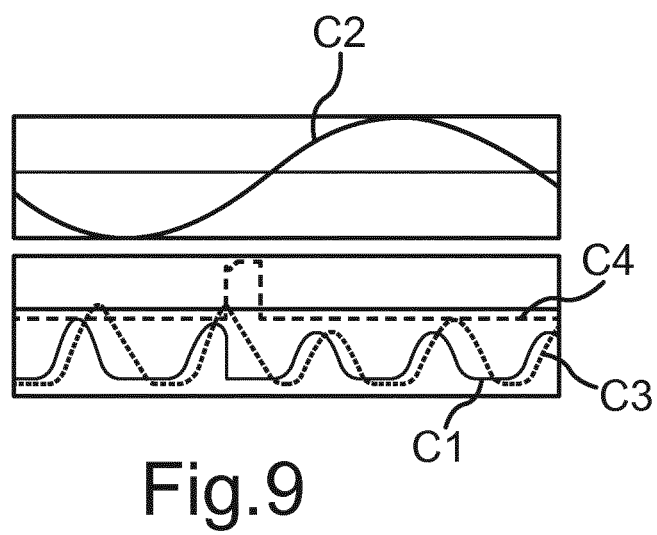
FIG. 9 shows a diagram with schematic signal timing profiles which were measured on an energy converter in accordance with FIG. 1 and which serve for defining the minimum switch-on time, FIG. 10 schematically shows a circuit diagram of an energy converter as illustrated in FIG. 1, but supplemented by a control unit.

FIG. 9 shows a diagram with a measured time profile of corresponding signals. As is evident from FIG. 9, at the switch-off point in time of a gate signal C4 a zero crossing detection signal C3 is still at a level of >0.7 V. The trigger condition is fulfilled primarily at the power supply system zero crossing. The upper diagram in FIG. 9 shows the input voltage at the energy converter, said input voltage being a power supply system voltage C2. The lower diagram shows an illustration magnified, that is to say zoomed, by approximately a factor of 100 in the region of the power supply system zero crossing of the power supply system voltage C2 from the upper diagram. A drain-source voltage C1 across a MOSFET used as a PFC transistor exhibits a periodic oscillation, wherein, at the point in time at which the gate signal C4 is switched on, the drain-source voltage C1 becomes 0 owing to the resultant switching on of the MOSFET.

The electronic switching element 22 thus has to be active for long enough to ensure that the zero crossing detection signal is pulled below the corresponding threshold. If that does not happen, the zero crossing detection signal can severely shorten the normal switch-off time owing to incorrect triggering. This then leads to uncontrollable jumps in the transmitted power.

A switch-on time of approximately 1.2 µs is set in FIG. 9. Therefore, the incorrect triggering occurs only sporadically under very unfavorable conditions at the power supply system zero crossing. This is comparatively noncritical, moreover, because only a very low or even no power is transmitted at the power supply system zero crossing anyway.

FIG. 10 shows an electronic circuit diagram of an energy converter such as the energy converter 10 from FIG. 1, wherein a control unit 30 is supplementarily illustrated in FIG. 10, said control unit completing the circuit from FIG. 1. With regard to the components already described in regard to FIG. 1, reference is made to the corresponding previous part of the description.

The control unit 30 has an input connection 32, which is electrically coupled to the connection terminal 16. The control unit 30 thus has information of the output voltage $U_{out}$ between the connection terminals 16, 18, said output voltage being provided by the energy converter 10, especially since—as is not evident from FIG. 10—said control unit is likewise connected to the reference potential—already mentioned above—of the connection terminals 14, 18. FIG. 10 provides equally little illustration of a comparison of the information about the output voltage $U_{out}$ with a setpoint value assigned thereto, nor does FIG. 10 illustrate that the result of said comparison is used for further processing.

The control unit 30 provides the deviation of the output voltage $U_{out}$ from its setpoint value both to an integration unit and to a proportional unit 36. These units process this signal and generate output signals, which are combined by means of a combination unit 38 to form a third signal 40. This third signal 40 is a signal which is proportional to the switch-on time of the MOSFET 22.

The third signal 40 is fed to a switch-on time unit 42 and a switch-off time unit 44. The switch-on time unit 42 is based on the switch-on time unit which is customary in the related art and which is generally provided for the transition mode. In the related art, the switch-on time unit generates a first signal 46 for a clock generator 50 connected thereto, which in the present case is embodied as a PWM unit. The switch-on time unit in the related art generates a proportional first signal 46 from the third signal 40.

In contrast to the related art, in the case of the switch-on time unit 42 according to the present disclosure it is provided that the proportionality is limited by the fact that a minimum switch-on time $t_{on\_min}$ cannot be undershot. As soon as the third signal 40 reaches the value for the minimum switch-on time $t_{on\_min}$, the proportionality that is customary in the related art is left and instead a constant value for the switch-on time $t_{on}$ is communicated as first signal 46 to the clock generator 50. The proportionality is accordingly provided only within the first power range. Within the second power range the minimum switch-on time $t_{on\_min}$ is provided, which is constant in this range.

The clock generator 50 generates a control signal X from the first signal provided by the switch-on time unit 42, said control signal being passed via a driver component 52 to a gate connection of the MOSFET 22. The first signal 46 therefore controls the time period of the switching on of the MOSFET 22.

The limit with respect to the fixed switch-on time of the switch-on time $t_{on}$ is simultaneously also the limit between the first power range and the second power range. The switch-on time unit 42 thus provides the proportionality between the third signal 40 and the first signal 46 only during operation in the first power range. In the second power range, in which the power is less than in the first power range, the first signal 46 is instead no longer proportional to the signal 40, but rather represents a fixed minimum switch-on time $t_{on\_min}$.

For the setting of the power in the second power range, the present disclosure now supplementarily provides the switch-off time unit 44, which is likewise fed by the same third signal 40. The switch-off time unit 44 is active exclusively in the second power range, in which the power is less than in the first power range. If the third signal 40 reaches a value which corresponds to a power in the first power range, the switch-off time unit 44 supplies a second signal having the value 0 to the clock generator 50. If the power to be transmitted is instead less than in the first power range, that is to say that it is power that comes under the second power range, the switch-off time unit 44 determines from the third signal 40 a supplementary switch-off time $t_{off\_add}$, which is communicated to the clock generator 50 by means of the second signal 48. The clock generator 50 detects the second signal, determines the supplementary switch-off time $t_{off\_add}$ therefrom and lengthens the switch-off time for the electronic switching element 22 by the supplementary switch-off time $t_{off\_add}$, that is to say that the switch-off time for the electronic switching element 22 results from the sum of the intrinsic switch-off time $t_{off}$ and the supplementary switch-off time $t_{off\_add}$. From the values of the switch-on time $t_{on}$ and the intrinsic switch-off time $t_{off}$, if appropriate plus the supplementary switch-off time $t_{off\_add}$, the clock generator 50 generates the signal X serving for controlling the MOSFET 22.

FIG. 11 shows in two diagrams schematic signal profiles illustrating operation in the second power range. It is evident from the upper diagram in FIG. 11 that the signal X present at the gate connection of the MOSFET 22 switches on the MOSFET 22 only for a comparatively short time period, namely the switch-on time $t_{on}$ which here is equal to the minimum switch-on time $t_{on\_min}$. In this time period, the current through the inductance rises substantially linearly, which is evident from the second, lower diagram in FIG. 11. At the end of the switch-on time $t_{on}$ defined by the signal X, the MOSFET 22 is switched off and the current through the inductance 20 decreases intrinsically down to the value 0, which is identified by the switch-off time $t_{off}$ in the second, lower diagram in FIG. 11.

In the transition mode, a new cycle with a new switch-on time $t_{on}$ of the signal X would then follow if a power in the first power range should be set. In FIG. 11, however, a power that is in the second power range should be set. Consequently, the switch-on time $t_{on}$ illustrated in FIG. 11, which is provided by means of the switch-on time unit 42, is the minimum switch-on time $t_{on\_min}$.

At the same time, in this operating state, the switch-off time unit 44 is active and supplies a supplementary switch-off time to the clock generator 50 with the second signal 48. Said clock generator generates a supplementary switch-off time $t_{off\_add}$, which follows the switch-off time $t_{off}$. After the supplementary switch-off time $t_{off\_add}$ has elapsed, a new switch-on cycle takes place.

In FIG. 10, with the integration unit 34, the proportional unit 36 and the combination unit 38, a PI controller is realized such as is generally used for clocked electronic energy converters in PFC operation. The controller usually calculates only the switch-on time in the related art.

According to the present disclosure, however, the switch-on time $t_{on}$ is limited by the minimum switch-on time $t_{on\_min}$. The latter cannot be undershot. Above this limit, the switch-on time $t_{on}$ is implemented proportionally. With the present disclosure, the supplementary switch-off time $t_{off\_add}$ is supplementarily added, which makes it possible to achieve a reduction of the transmitted power if the switch-on time $t_{on}$ assumes the minimum switch-on time $t_{on\_min}$.

In this embodiment, it is provided that the controller is realized digitally by means of a microprocessor. The following sequence is provided for the determination of the supplementary switch-off time $t_{off\_add}$:

the input current in the transition mode results as follows:

$$I_{meanT} = \frac{U_{in} * t_{on}}{2L}$$

The current in the discontinuous mode with a fixed minimum switch-on time results as follows:

$$I_{meanD} = \frac{U_{in} * t_{on\_min}}{2L} * \frac{t_{on\_min} + t_{off}}{t_{on\_min} + t_{off} + t_{off\_add}}$$

A function is sought in which the supplementary switch-on time is a function of a comparable variable switch-on time, wherein $$I_{meanT} = I_{meanD}.$$

$$\frac{1}{I_{meanT}} = \frac{1}{I_{meanD}} \Rightarrow \frac{2L}{U_{in} * t_{on}} = \frac{2L}{U_{in} * t_{on\_min}} * \frac{t_{on\_min} + t_{off}}{t_{on\_min} + t_{off} + t_{off\_add}}$$

$$t_{off\_add}(t_{on}) = \frac{t_{on\_min}(t_{on\_min} + t_{off})}{t_{on}} - t_{on\_min} - t_{off}$$

$$\text{where } t_{off} = \frac{U_{in} * t_{on\_min}}{U_{out} - U_{in}}$$

In the case of a DC voltage, the determination of the supplementary switch-on time involves a 1/X function with an offset.

As is evident from the formula mentioned above, $t_{off}$ is dependent on the input voltage $U_{in}$ and the output voltage $U_{out}$. Consequently, for the non-steady-state case, the supplementary switch-off time $t_{off\_add}$ is also dependent not only on $t_{on}$ but on the intrinsic switch-off time $t_{off}$. With the following formula, therefore, under all conditions, a substantially seamless transition can be realized.

$$\int_0^{0.01} \frac{U_{in}^2 * t_{on}}{2L} dt = \int_0^{0.01} \frac{U_{in}^2 * t_{on\_min}}{2L} * \frac{t_{on\_min} + \frac{U_{in} * t_{on\_min}}{U_{out} - U_{in}}}{t_{on\_min} + \frac{U_{in} * t_{on\_min}}{U_{out} - U_{in}} + t_{off\_add}} dt$$

$$\text{where } U_{in} = U_p * \sin(2\pi * 50 \text{ Hz} * t)$$

Figure 12:
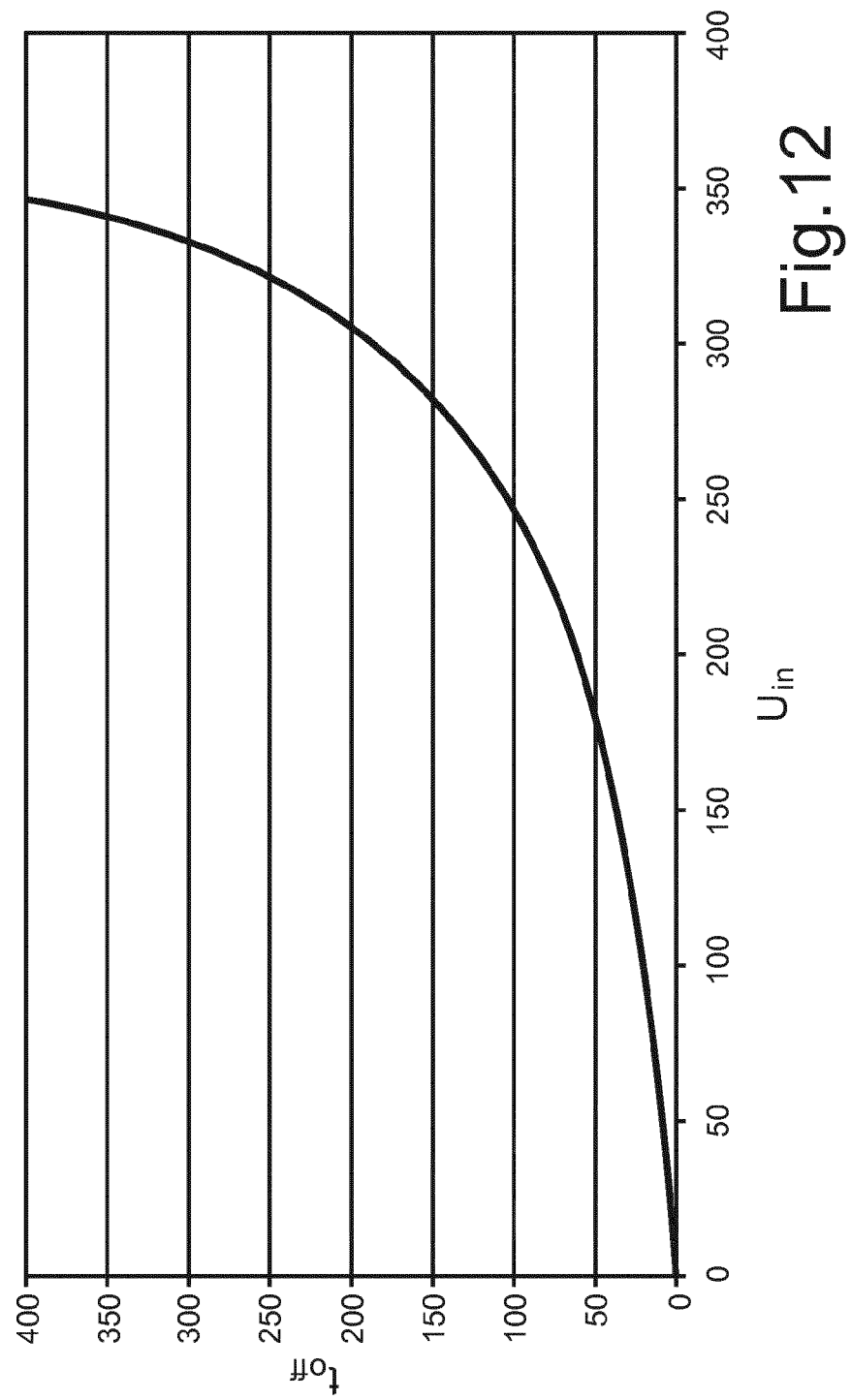
FIG. 12 shows a diagram which schematically illustrates the profile of discrete switch-off time steps against the input voltage.

FIG. 12 schematically shows a profile of the input voltage $U_{in}$ in the unit of volts against the switch-off time $t_{off}$ as the number of ticks in the case of a fixed output voltage $U_{out}$ of 400 V and in the case of a minimum switch-on time $t_{on\_min}$ that corresponds to 60 ticks. A tick is a smallest step of a time frame which can be set by means of a microprocessor. The input voltage $U_{in}$ in volts is plotted on the abscissa, whereas the number of ticks which correspond to the switch-off time $t_{off}$ is indicated on the ordinate.

A simplification with regard to the computation time can be achieved if the corresponding operating point is linearized and, for example, the input voltage 230 V and the output voltage 400 V are chosen. With $t_{on\_min}$=60 ticks, the following formula results:

$$t_{off\_add}(t_{on}, U_{in}, U_{out}) = \frac{t_{on\_min}\left(t_{on\_min} + \frac{U_{in} t_{on\_min}}{U_{out} - U_{in}}\right)}{t_{on}} - t_{on\_min} - \frac{U_{in} t_{on\_min}}{U_{out} - U_{in}}$$

Figure 13:
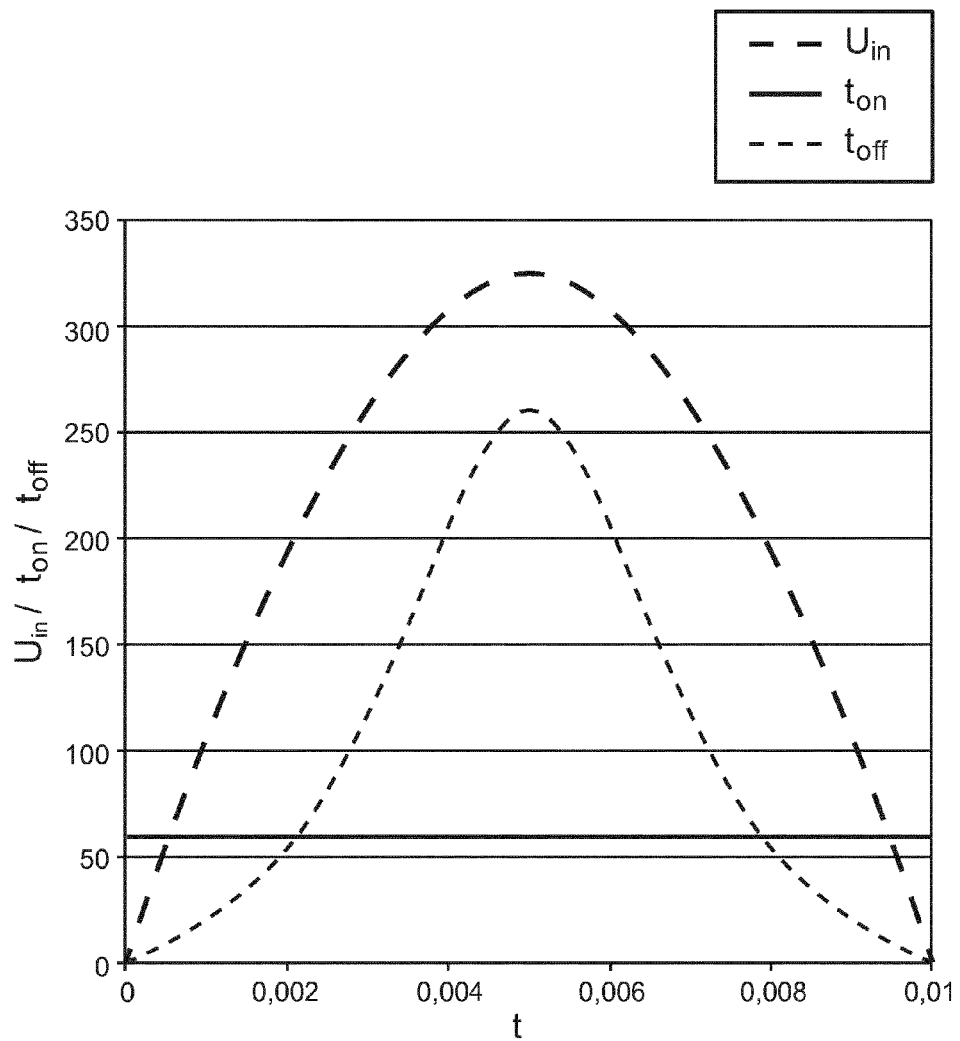
FIG. 13 shows a diagram which schematically illustrates graphs illustrating the switch-on time and the switch-off time depending on a power supply system half-cycle in the case of a power supply system voltage source as energy source.

Of course, these simplifications cannot simply be adopted for AC voltage operation because the input voltage $U_{in}$ permanently changes. FIG. 13 shows one example of a switch-on time $t_{on}$ and an intrinsic switch-off time $t_{off}$ over a power supply system half-cycle during the operation of an up-converter, also called step-up converter or boost converter, from a public energy supply network with an input voltage $U_{in}$ of 230 V and 50 Hz. The diagram illustrated in FIG. 13 schematically illustrates corresponding profiles. The abscissa shows time t in seconds, whereas the input voltage $U_{in}$ in volts and the number of ticks correlated with the switch-on time $t_{on}$ and the intrinsic switch-off time $t_{off}$ are indicated on the ordinate.

Two points should be clarified in this context, namely whether a linearization as in the case of DC current is possible and what input voltage $U_{in}$ is defined as the operating point. In this case, the intention is for the controller behavior as far as possible not to be changed and for control which has the following properties to be sought:

$$t_{off\_add}(t_{on}, 230\text{ V}, 400\text{ V}) = \frac{8470}{t_{on}} - 141$$

where $t_{on\_min} = 60[\text{ticks}]$

Figure 14:
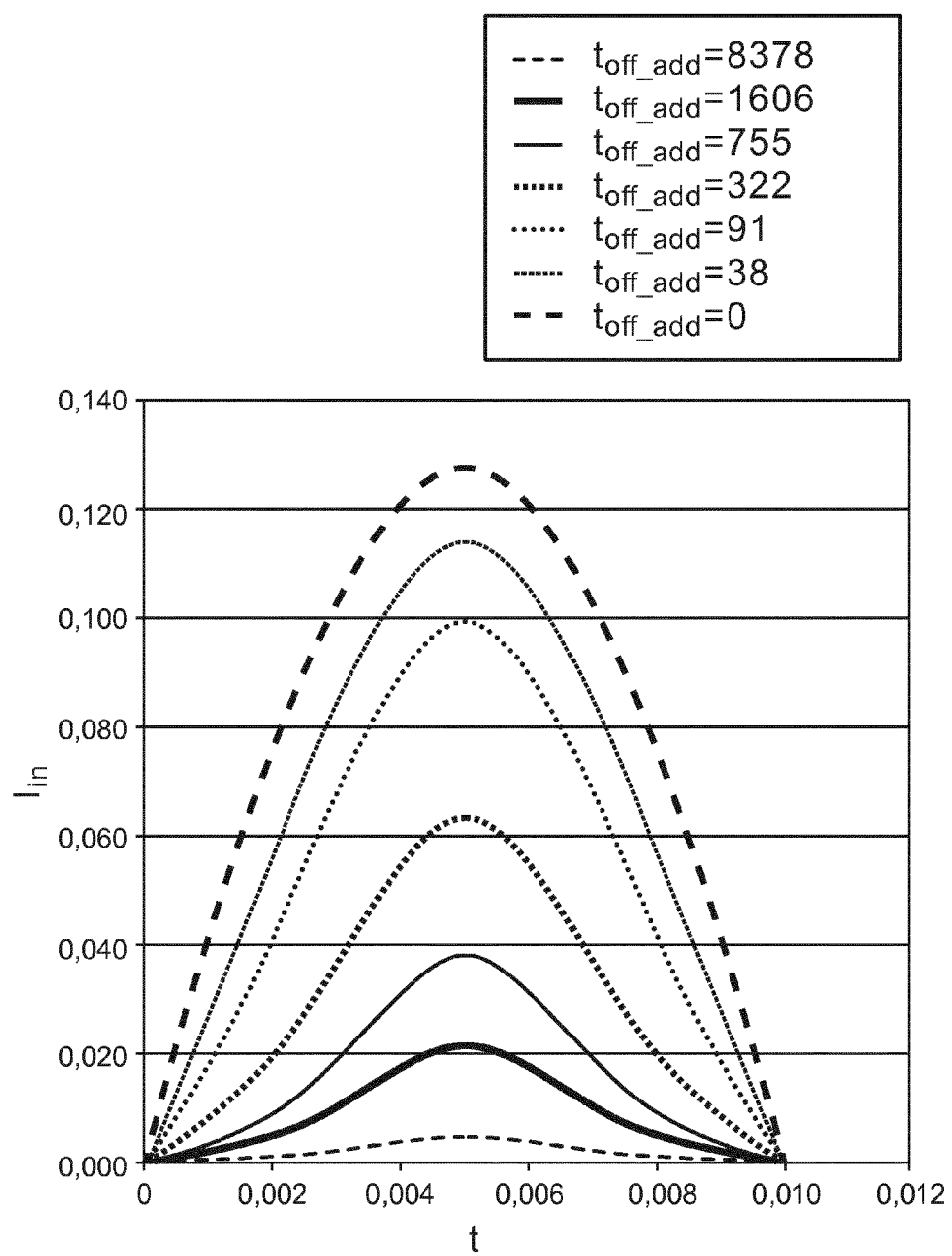
FIG. 14 shows a diagram which schematically illustrates input current profiles of the energy converter during operation in accordance with FIG. 13 for different supplementary switch-off times.

From the abovementioned formula, the following requirement arises for the boost operating mode with AC voltage and taking account of power factor control:

the supplementary switch-off time $t_{off\_add}$ ought to be determined accurately enough that, averaged over a half-cycle, the transmitted power in the discontinuous mode is of the same magnitude as during standard operation in the transition mode. It emerges from this that in AC voltage operation, too, the supplementary switch-off time $t_{off\_add}$ ought to remain substantially constant over the entire half-cycle. This of course changes the waveform of an input current $I_{in}$, which is then not sinusoidal over the entire range, which is evident from FIG. 14. The diagram illustrated in FIG. 14 indicates time t in seconds on the abscissa and the input current $I_{in}$ in amperes on the ordinate. The various supplementary switch-off times $t_{off\_add}$ correspond to different powers. The profile of the input current $I_{in}$ in the discontinuous mode is plotted as a set of curves against time t with in each case a fixed parameter for the supplementary switch-off time $t_{off\_add}$, wherein the parameter values for the supplementary switch-off time $t_{off\_add}$ are indicated in a number of ticks. In the special case $t_{off\_add}=0$, a sinusoidal profile results for $I_{in}$ since $t_{off\_add}=0$ identifies the transition mode.

It turns out that the function can be realized for the following reasons. Firstly, the PFC control or the PFC controller is slow anyway, and so a slightly changed waveform within a half-cycle does not entail a detectable influence. Furthermore, it is evident from FIG. 14 that the curve profile deviates significantly from the sinusoidal shape only in the case of small input currents. This is noncritical insofar as requirements made of the harmonics are not as stringent below 25 W. Furthermore, parasitic effects occur anyway with very low currents; by way of example, an X-capacitor that is generally present is no longer fully discharged, and the current can have a gap after the power supply system voltage zero crossing.

It emerges from this that the calculation for the case of AC current fundamentally and with carefully considered linearization can use the same simple formula as for the case of DC current. This circumstance allows this type of driving to be implemented on normal 8-bit microprocessors as well.

Overall, it is evident that the power range in the transition mode is limited downward by parasitic effects. Starting from a very short switch-on time, the MOSFET 22 does not switch on any longer anyway, previously the diode 24 already not switching on any longer. Resistances are often provided in the gate connection of the MOSFET 22, said resistances being chosen with a corresponding magnitude in order to flatten switching edges deliberately in order to be able to better comply with EMC requirements. Furthermore, the efficiency can deteriorate at very high frequencies. In digital implementations, the resolution of a respective stage can also be reduced because the switched-on duration of the MOSFET can only be the multiple of an internal clock frequency.

It therefore appears desirable to realize the seamless transition from the transition mode to the discontinuous mode using simple means with sufficient quality.

Major factors in this respect are the maintenance of the normal switch-off time, namely the intrinsic switch-off time $t_{off}$, as in the transition mode, the minimum length of the switch-on time $t_{on\_min}$ in order to avoid incorrect triggerings, the introduction of an additional supplementary switch-off time $t_{off\_add}$, and a simple 1/X function for calculating the additional supplementary switch-off time $t_{off\_add}$ for the seamless transition.

The method can be used in the PFC stage of the OTi90DALI. The implemented formula $t_{off\_add}(t_{on})=9250/t_{on}-154$ deviates only little from the above-calculated formula $t_{off\_add}(t_{on})=8470/t_{on}-141$. The formula appears to be suitable for all demanded operating cases. Given these boundary conditions, the maximum supplementary switch-off time is currently restricted to approximately 4000 ticks at 48 MHz on account of hardware restrictions. Even longer supplementary switch-off times can be realized with newer hardware.

In particular, the present disclosure can also be applied to a step-down converter, in order to be able to dim down further in the case of luminaires, for example.

Figure 15:
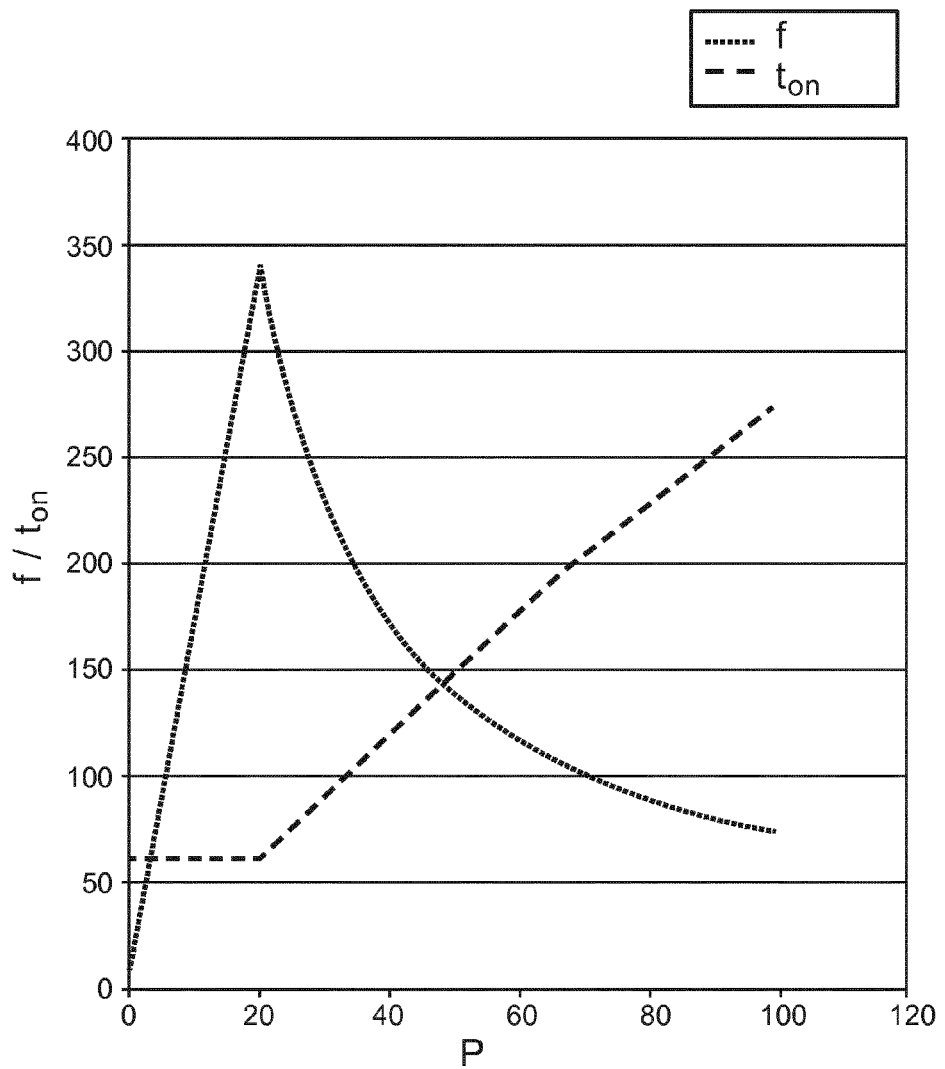
FIG. 15 shows a diagram which schematically illustrates two graphs illustrating the frequency and the switch-on time of the electronic switching element against the input power of the energy converter.

FIG. 15 shows in a diagram schematic profiles for a frequency f and the switch-on time $t_{on}$ against an input power P in the case of a circuit in accordance with FIG. 10. The input power P in watts is indicated on the abscissa, whereas the frequency f in kHz and the switch-on time $t_{on}$ in ticks relative to 48 MHz are indicated on the ordinate. In this configuration, the input voltage is 230 V, the output voltage is 400 V, and the inductance of the energy store, which here is an inductance, is 1.6 mH.

The embodiment serves merely for explaining the present disclosure and is not restrictive for the present disclosure.

In this regard, of course, functions, in particular electronic components and the energy converter can be fashioned as desired without departing from the concept of the present disclosure.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A clocked electronic energy converter comprising:
an electronic switching element,
at least two electrical energy stores,
a first connection for connecting an electrical energy source,
a second connection for connecting an electrical energy sink,
a clock generator configured to generate a control signal for the electronic switching element in switching operation with a switch-on time and a switch-off time,
a switch-on time unit for generating a first signal for the clock generator, which switch-on time unit is designed to set a power to be transmitted of the energy converter in a first power range by means of the first signal and to generate, in a second power range, in which the power can be set to be less than in the first power range, a first signal for the clock generator, said first signal representing a fixedly predefined switch-on time,
a switch-off time unit, which is designed to generate a second signal for the clock generator in the second power range, said second signal representing a supplementary switch-off time depending on the power to be transmitted,
wherein the switch-off time unit is configured to either average the supplementary switch-off time in the second power range as a function of the power to be transmitted via a network half-wave, or carry out the determination of the supplementary switch-off time in the second power range based on an electrical voltage present at the first connection and/or an electrical voltage present at the second connection, and
wherein the electronic energy converter is a power factor control circuit and is configured to control the switch-on time unit and the switch-off time unit jointly by means of a single third signal.

2. The energy converter as claimed in claim 1, wherein the switch-off time unit is designed to determine a voltage form of the electrical voltage present at the first connection and to carry out the determination of the supplementary switch-off time in the second power range depending on the determined voltage form.

3. The energy converter as claimed in claim 1, wherein the energy converter is designed to operate in the second power range in the case where a power of the energy converter that is drawn at the first connection is at most 1 W.

4. The energy converter as claimed claim 1, a detection unit for determining a switch-off time for the electronic switching element, said switch-off time arising intrinsically as a result of the electronic energy converter.

5. The energy converter as claimed in claim 1, further comprising an energy detector for detecting at least the energy stored in one of the electrical energy stores of the energy converter.

6. A lighting device comprising an illuminant and an electrical connection for connecting the lighting device to an electrical energy source, wherein the lighting device comprises a clocked electronic energy converter, which supplies, as load, the illuminant with electrical energy in a power-controllable manner the clocked electronic energy converter comprising:
an electronic switching element,
at least two electrical energy stores,
a first connection for connecting an electrical energy source,
a second connection for connecting an electrical energy sink,
a clock generator configured to generate a control signal for the electronic switching element in switching operation with a switch-on time and a switch-off time,
a switch-on time unit for generating a first signal for the clock generator, which switch-on time unit is designed to set a power to be transmitted of the energy converter in a first power range by means of the first signal and to generate, in a second power range, in which the power can be set to be less than in the first power range, a first signal for the clock generator, said first signal representing a fixedly predefined switch-on time,
a switch-off time unit, which is designed to generate a second signal for the clock generator in the second power range, said second signal representing a supplementary switch-off time depending on the power to be transmitted,
wherein the switch-off time unit is configured to either average the supplementary switch-off time in the second power range as a function of the power to be transmitted via a network half-wave, or carry out the determination of the supplementary switch-off time in the second power range based on an electrical voltage present at the first connection and/or an electrical voltage present at the second connection, and
wherein the electronic energy converter is a power factor control circuit and is configured to control the switch-on time unit and the switch-off time unit jointly by means of a single third signal.

7. A method for setting an electrical power to be transmitted by means of a clocked electronic energy converter, for which purpose an electronic switching element of the electronic energy converter which is a power factor control circuit is operated in switching operation with a switch-on time and a switch-off time,
wherein, in a first power range, the power is set depending on the switch-on time and the switch-off time for the electronic switching element, said switch-off time arising intrinsically as a result of the electronic energy converter and following the switch-on time, and
wherein, in a second power range, in which the power is set to be less than in the first power range, the switch-on time is kept substantially constant and the switch-off time for the electronic switching element is lengthened by a supplementary switch-off time that can be set depending on the power to be transmitted,
wherein, in the second power range, the switch-off time is set to either average the supplementary switch-off time as a function of the power to be transmitted via a network half-wave, or carry out the determination of the supplementary switch-off time based on an electrical voltage present at the first connection and/or an electrical voltage at the second connection, and
wherein, in the second power range, the switch-on time and the supplementary switch-off time are determined jointly depending on a single third signal.

8. The method as claimed in claim 7,
wherein the supplementary switch-off time is determined in the second power range in such a way that the power to be transmitted depends on the third signal in the same way as if the power to be transmitted in the second power range were controlled analogously to the first power range.

9. The method as claimed in claim 7, wherein the power to be transmitted is changed continuously in the event of a change in the power range.

10. The method as claimed in claim 7, wherein the time period required by one of the electrical energy stores of the energy converter after the switch-on time until it no longer outputs electrical energy is determined as the switch-off time.

11. The method as claimed in claim 7, wherein the supplementary switch-off time is determined depending on the third signal, wherein the determination is carried out by means of a reciprocal value—weighted with a factor—of the third signal, from which an offset value is subtracted.

12. The method as claimed in claim 7, wherein the supplementary switch-off time is determined taking into account in each case steady-state conditions for an electrical voltage of an energy source connected to the energy converter and of an electrical voltage provided by the energy converter for a load connected to the energy converter such that the supplementary switch-off time depends exclusively on the desired power.

13. The method as claimed in claim 7, wherein the energy converter, on the input side, uses an AC voltage and is controlled in such a way that an input-side power factor is maximized.

14. The method as claimed in claim 13, wherein the supplementary switch-off time, in the case of a constant third signal, is likewise constant within half a period or a whole period of the AC voltage used on the input side.

* * * * *